2 Sheets--Sheet 1.

GEORGE C. JENNISON.

Baker's Oven.

No. 4,783. Reissued March 5, 1872.

Witnesses.

Isaac. H. How

William Adamelly

George C. Jennison,
By Thos. G. How
Atty

GEORGE C. JENNISON.

Baker's Oven.

No. 4,783. Reissued March 5, 1872.

Witnesses.

Isaac H. Howe

William Adamelly

George C. Jennison

By Thos. H. Howe

Atty

UNITED STATES PATENT OFFICE.

GEORGE C. JENNISON, OF PHILADELPHIA, PENNSYLVANIA, ASSIGNOR TO HIMSELF AND JOHN RAYNEY, OF BROOKLYN, NEW YORK.

IMPROVEMENT IN BAKERS' OVENS.

Specification forming part of Letter Patent No. 22,809, dated February 1, 1859; reissue No. 4,783, dated March 5, 1872.

Specification of certain Improvements in Ovens, invented by GEORGE C. JENNISON, formerly of Ware, in the county of Hampshire and State of Massachusetts, now of Philadelphia, in the county of Philadelphia and State of Pennsylvania.

*Nature and Object of the Invention.*

This invention is designed to produce an efficient oven for the use of bakers in baking bread, crackers, and similar articles of food; and its principal objects are the economization of the heat of the fire in heating the oven, and at the same time the securing of such an introduction of the heat into the oven, and such diffusion of the heat through it, and, also, such a shifting of the position in the oven of the articles to be baked during the operation of baking, as shall expose the whole thereof to like degrees of heat. The principal features of this invention consist in the construction (hereinafter described) of the oven, by which the products of combustion, or a portion thereof, are admitted directly upward into the baking-chamber, in combination with a carrier for changing the position in the oven of the articles to be baked, as hereinafter more fully set forth.

*Description of the Accompanying Drawing.*

Figure 1:
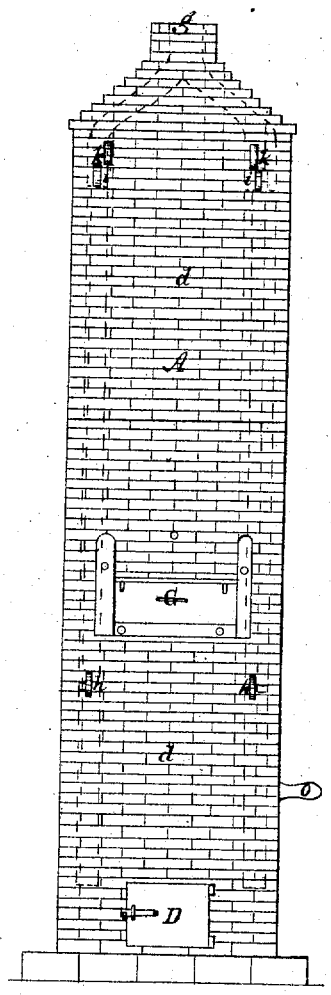
Figure 2:
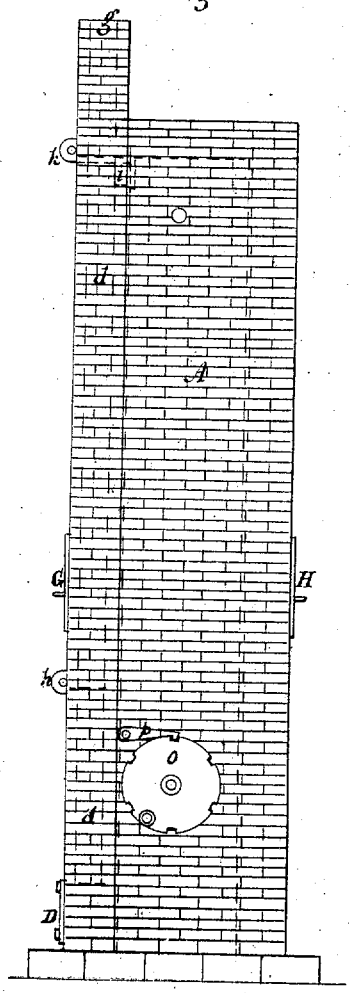
Figure 6:
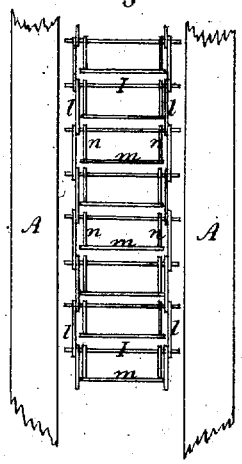
Figure 3:
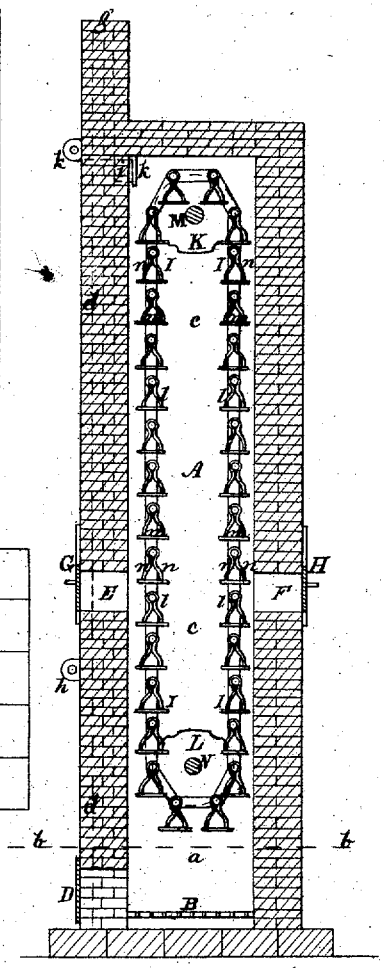
Figure 4:
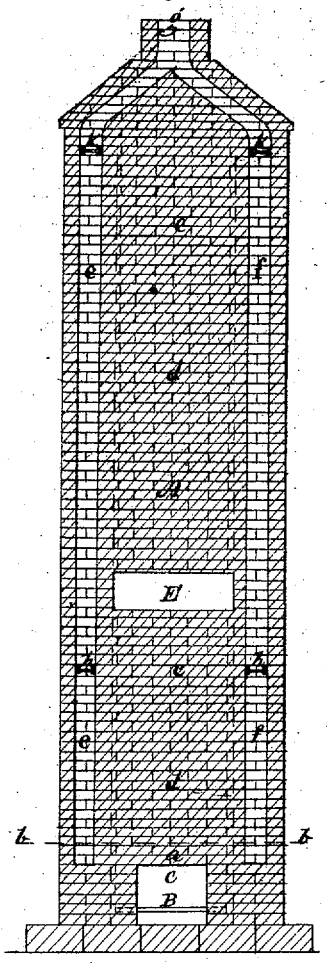
Figure 5:
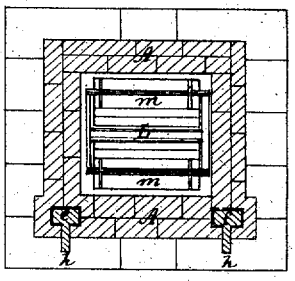

Figure 1 is a front view of an oven embodying my invention. Fig. 2 is a side elevation. Fig. 3 is a vertical transverse section of it through the middle. Fig. 4 is a vertical section, taken through the smoke-flues. Fig. 5 is a horizontal section, taken through the lower dampers. Fig. 6 is a side view of a portion of the carrier and the shelves attached thereto on which the articles to be baked are placed.

*General Description.*

A is the inclosure which forms the oven or baking-chamber, and which, also, in the construction represented, incloses the fire-box and ash-pit. This inclosure or oven is covered at the top, and is here represented as being nearly or quite square in its horizontal section, and tall in proportion to its breadth, though it will be evident from a full examination of the invention that this oven need not be strictly limited to the proportions here shown. It is provided with a grate, B, placed near the bottom, on which grate the fuel for heating the oven is to be placed. *a*, which is the space below the dotted line *b b*, constitutes the fire-chamber. *c*, which is the space inside of the oven above the line *b b*, constitutes the baking-chamber. In the construction here shown the entire bottom of the baking-chamber opens directly into the combustion or fire-chamber. C is an opening into the fire-chamber, which is provided with a door, D, for the introduction of fuel, and for other purposes. E and F are openings at the front and back sides of the oven, respectively, for the introduction of bread or other articles to be baked, and these openings are provided with sliding doors G and H, respectively. I is an endless carrier, consisting of four sprocket-wheels, K K L L, fixed on two horizontal shafts, M N, and two sprocket endless chains, made up of links *l*, which are united by round rods extending through both chains, as shown in the drawing. Upon these rods brackets *n* are hung in such a manner as to allow them to turn freely upon the rods. *m m* are shelves, which are firmly attached to the brackets *n*, and their weight, together with that of the brackets *n*, always keeps them in a horizontal position, as shown in the drawing; and when the carrier is operated the arms *n* turn upon the rods by which they are supported, so as to retain the shelves *m* in this horizontal position. These shelves *m* are designed to receive and support the bread or other article to be baked during the process of baking. In the front wall *d* are one or more flues, *e f*, which extend upward from and open out of the upper part of the furnace *a*, and terminate in a chimney, *g*, said flues being provided with dampers *h h* at or near the openings into them from the furnace. These flues have other openings, *i i*, into them from the baking-chamber, which openings are provided with closing-slides or dampers, *k*. It is obvious that when the slides or dampers *h h* are closed, and the dampers *k k* opened, the volatile products of combustion must all pass directly upward from the furnace below into the baking-chamber, and, rising to its top, be discharged therefrom through the openings *i i* into the upper part of the flues *e f*, and pass off through the chimney *g*. But if, on the other hand, the dampers *k* are closed and the dampers *h* opened, their products of combustion must enter these flues at the bottom directly from the furnace, and be conducted through them into the chimney, and by partially opening both these sets of dampers a portion of the products of combustion passing through the fire-chamber may be regulated, and the consequent heat of the oven modified to suit the circumstances of the case.

Fire having been built upon the grate B, and the oven properly heated, the bread or other article to be baked is placed upon the shelves *m*, (being introduced through the openings E,) said shelves being successively brought into position for that purpose by rotating shaft N, which is done by means of a wheel and crank, O, placed on the end of said shaft and outside of the oven, said wheel being notched on its outer edge, and provided with a catch or pawl, *p*, to keep it in any desired position. During the process of baking, the positions of the different shelves *m* in the oven, and the bread or other articles thereon, may be shifted, as occasion may require, by rotating the shaft N by the means already described; and the bread may be removed through the openings E and F, or either of them, as may be desired; or the bread may be introduced through one of these openings, and removed through the other. In the construction I have described open communication is left between the furnace and baking-chamber, so that the heat and products of combustion may arise directly from the heating-chamber to the cooking-chamber, and properly heat all parts of the latter. It may be observed, also, that the combination with the baking-chamber and furnace of the flues *e* and *f*, open at the lower end into the said furnace, has a tendency to draw the heavier products of combustion into the said flues at the bottom, and carry them off into the chimney without their entering the baking-chamber, while the heat, with, perhaps, some of the lighter products, has a tendency to rise directly upward into and in the baking-chamber. I prefer anthracite coal for the fuel to be used, but other suitable fuels may be employed.

I prefer the construction herein described of the carrier I, with its shelves for receiving the bread or other article to be baked; but, while I regard this construction as the best, it is not entirely essential to the realization of a part of my invention that this particular form of carrier should be employed, so long as a carrier is employed which will change the position of the bread in the baking-chamber.

*Claims.*

I claim as my invention—

1. Arranging the heating-chamber directly under the cooking-chamber and in direct communication with it, in combination with a carrier adapted to change the position in the cooking-chamber of the bread or other material to be cooked.

2. The arrangement of the cooking-chamber with respect to the furnace and its discharge-flues, substantially as herein described, and as represented in the drawing, whereby the advantage of the ascending power of the heat is availed of, while the smoke or principal portion thereof is carried off by the flues.

3. The arrangement of the charging and discharging orifices of the baking-chamber with reference to it and the lower smoke-eduction passage leading into the discharge-flue of the oven.

4. The combination and arrangement of one or more openings, *i i*, and the damper or dampers *k*, or equivalent, with the baking-chamber and its furnace and flues, arranged as specified.

GEORGE C. JENNISON.

Witnesses:
J. RANKINSHOE,
JOHN J. MILLER.